May 6, 1958      G. F. GRONDIN      2,833,858
CODE CONVERTER Filed Feb. 28, 1956      10 Sheets–Sheet 1

FIG 1

INVENTOR.
GEORGE F. GRONDIN
BY
ATTORNEY

May 6, 1958  G. F. GRONDIN  2,833,858
CODE CONVERTER
Filed Feb. 28, 1956  10 Sheets-Sheet 8

FIG. 9

INVENTOR.
GEORGE F. GRONDIN
BY
*Marvin Moody*
ATTORNEY

United States Patent Office 2,833,858
Patented May 6, 1958

2,833,858

CODE CONVERTER

George F. Grondin, Van Nuys, Calif., assignor to Collins Radio Company, Cedar Rapids, Iowa, a corporation of Iowa Application February 28, 1956, Serial No. 568,219

8 Claims. (Cl. 178—70)

This invention relates in general to communication systems and in particular to apparatus for use with radio telegraphy systems which utilize the principles of ideal detection. Such system as described in Patent No. 2,676,245 to Melvin L. Doelz entitled "Polar Communication System" utilize synchronous operation to take advantage of the action expected time of arrival of the signal. This synchronous operation provides timing information used to gate high Q resonant circuits to obtain very narrow band predetection filtering; which action excludes the detection of noises as much as possible. Such systems basically form an ideal system taking advantage of a complete knowledge of the incoming signal (except for the individual signal information carrying coordinates).

In the common teletypewriter system employing the "5-unit" code, seven impulses or elements are required for each character; since, in addition to the five units defining the character, each character group begins with a synchronizing "start" (space) pulse and ends with a "stop" (mark) pulse. The devices responsive to initial keyboard operations are mechanical. With the depression of a key operation, a system of cams and selectors initiates a given sequence of make and break connections including the start, stop, and 5-element sequence characteristic of a given character. While the seven elements of each character are in this instance synchronous, that is, the start, stop, and 5-element character identifying group are of a predetermined time sequence, the repetition rate of successive character sequences is random, determined by the manual key depression. Thus, in general the start pulse and 5-element character group are of a predetermined time sequence but the stop element is of random lengths.

Devices have been developed wherein a complete utilization of transmission time is made possible by use of prepunching the code elements on a perforated tape, which may be then fed synchronously to the teletypewriter in lieu of manual key depression.

By this invention a means is presented wherein in lieu of using a prepared tape, synchronous read-out device, an electronic code converter accepts random teletypewriter on-off code groups and converts them to a synchronized transmission of characters at a fixed repetition rate.

In basic operation this invention receives and stores the five character-defining elements individually in a series of electronic storage circuits. Information at this storage level is applied to a series of read-out gates and synchronous clock pulses read out the data to provide a completely synchronous signal for the teletypewriter frequency shift generator. The rate at which the code elements are read out is chosen to be somewhat faster than the rate at which the non-synchronous elements are supplied to the converter. Circuitry is, therefore, provided whereby the output is caused to pause periodically and wait for the input to "catch up." During these periods the output from the converter is command information in the form of mark-hold. By a unique and effective utilization of the time relationships between the non-synchronous input and the synchronous read-out rate, only one storage or selector level is necessary.

It is an object of this invention, therefore, to provide an electronic code converter to supply synchronous code output from a non-synchronous input. It is a further object of this invention to provide effective use of time relationships wherein but one storage level is necessitated. This invention features an element read-out rate which is faster than the element read-in rate, yet suffers no loss of information since the character read-in rate of the incoming information does not exceed that of the synchronously read-out information. These and other features and objects of this invention will become apparent from the following description and claims when read in view of the drawings in which:

Figure 8:
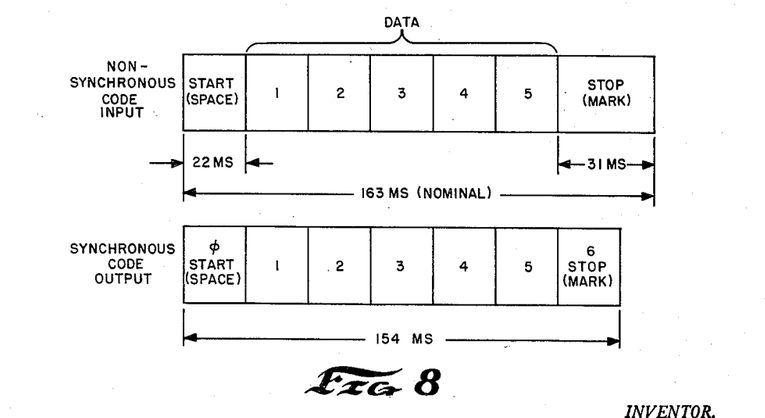
Figure 8 illustrates the relative time relationship between a non-synchronous code input character and a synchronous output character.

With reference to Figure 8, the non-synchronous code input from a start-stop teletypwriter is composed of seven elements per character, including a start space of 22 ms. duration followed by five 22-ms. elements defining a particular character and a stop element 31 ms. in duration. The nominal transmission rate from a 60 word per minute teletypewriter is thus shown to be 163 ms. The synchronous code output character from the proposed code converter is seen to be made up of seven elements, including a start element, five character timing element and a stop element, all of which are 22 ms. in duration. The synchronous output cycle, therefore, is 154 ms. per character. The output from a teletypewriter is non-synchronous in that a 31 ms. stop element in conjunction with 22 ms. start and character defining element is not compatible with a synchronous timing scheme in itself, and further the 31 ms. stop element is not immediately followed by a start due to the inherent delay introduced by manual key depression. The purpose of this code converter, therefore, is to convert non-synchronous data from a start-stop Teletype machine to a completely synchronous signal. From Figure 8, it is seen that the synchronous code output rate, being faster than the non-synchronous input rate, will necessitate a synchronizing feature wherein under certain phasing conditions character read-out is interrupted and synchronous command information is supplied until such a time as the input "catches up."

Figure 1:
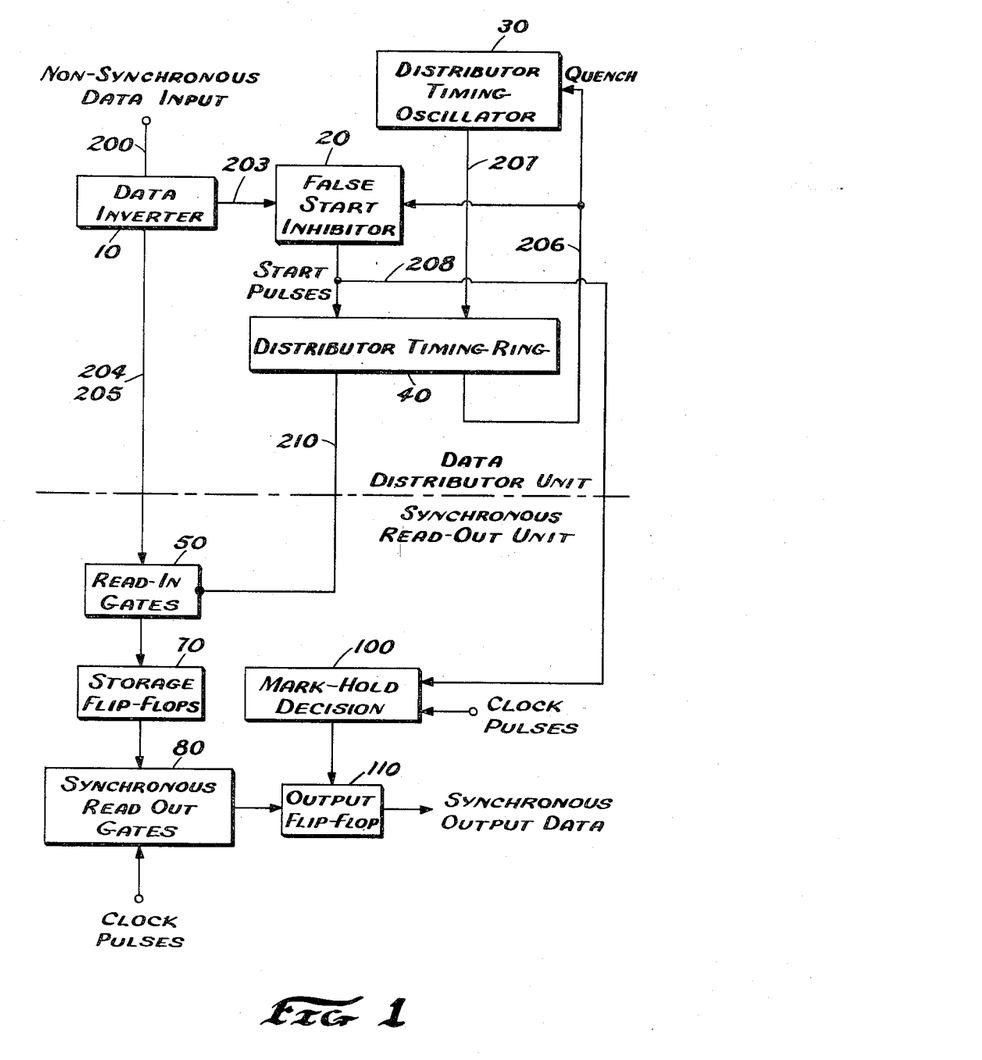
Figure 1 is a simplified functional block diagram of the invention.

With reference to Figure 1, the code converter of this invention is seen to be composed of two functional units, the data distributor unit and the synchronous read-out unit. In the data distributor unit, the input start-stop signal from a source Teletype machine is supplied through connector 200 to a data inverter 10 from which an input is supplied through connector 203 for a false start inhibitor 20. False start inhibitor 20 provides a proper start pulse and advances a timing ring 40 through one cycle of operation. The ring is controlled by a distributor timing oscillator 30 which provides a series of trigger pulses occurring approximately in the center of each character identifying element of the incoming code. The output pulses from distributor timing ring 40 are individually applied to a series of read-in gates 50 in the synchronous read-out unit. Inputs from data inverter 10 control read-in gates 50 which distribute the data to the storage flip-flops 70 in accordance with the mark or space condition defining each code element. Information from storage flip-flops 70 is read out to output flip-flop 110 through a series of synchronous read out gates 80 which are controlled by a series of synchronous clock pulses, thus output flip-flop 110 provides synchronous output data of either mark or space condition depending on the condition of storage flip-flops 70 at the time of arrival of the clock pulses to the read-out gates 80. Output flip-flop 110 is, in addition, controlled by circuitry 100 indicated as "mark-hold decision." The basic operation of the decision function circuitry is to analyze and control the phase relationships between the start pulses from false start inhibitor 20 and specific clock pulses such that, should a non-synchronous input start pulse arrive after the time of a synchronous clock start pulse, information from storage flip-flops 70 through read-out gates 80 will not affect the condition of the output flip-flop and further, the output flip-flop is locked in a mark-hold condition for the duration of a complete synchronous cycle. The manner in which this control is attained will be further described in detail.

In general the circuitry of this invention consists of pulse-type circuits, the operation of which is well known in the art. However, the manner in which these circuits are functionally combined provides a new and unique end result. Before a detailed consideration of the operation of this converter, a few of the somewhat unusual circuits encountered will be discussed.

*Flip-flop multivibrator.*—The flip-flop multivibrator, herein referred to as a "flip-flop," is used for several purposes in this code converter. This type of multivibrator is well known in the art and a detailed explanation of its operation need not be included here. It should be indicated, however, that the term "flip-flop" as used hereafter refers to a bistable type of multivibrator circuit wherein one triode is conducting heavily and the other is cut off for a particular stable condition. The flip-flop remains in this condition until triggered by an external source at which time the conducting and the non-conducting states reverse. All flip-flops in this code converter are triggered with negative-going pulses applied to the grid of the conducting triode, since the circuit is more sensitive to this trigger polarity.

*Distributor timing ring.*—As discussed with reference to Figure 1 a distributor timing ring 40 generates a plurality of pulse outputs in time distribution controlled by a factor initiated by timing oscillator 30. Such a triode ring is essentially an electronic stepping switch actuated by negative going control pulses. The timing ring 40 in this application employs a 6-element triode ring to distribute the data pulses of the input teletypewriter character to the storage flip-flops 70.

Figure 10:
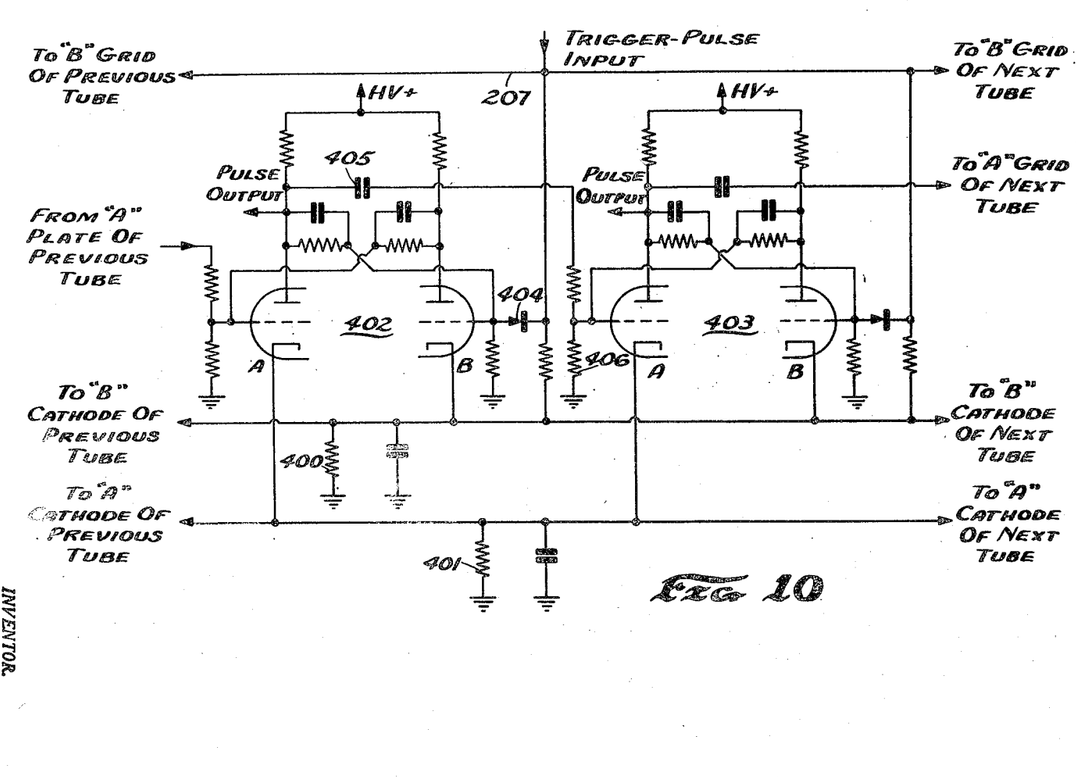
Figure 10 is a schematic presentation of a portion of the timing ring employed in the read-in circuitry.

Each ring element consists of a multivibrator flip-flop which, when it is switched from one condition to the other, generates a pulse that causes the next flip-flop to switch. With no trigger pulse input, the "B" section of one flip-flop is conducting while the "A" sections of the other five are conducting. Then when a trigger pulse is applied to the ring, the flip-flop in "odd" condition switches to "normal" and the following flip-flop switches to "odd." As shown in Figure 10, cathode resistor 400 provides correct bias when only one "B" section is conducting and resistor 401 provides correct bias when five "A" sections are conducting. Thus, when plate voltage is first applied to the circuit and several "B" sections attempt to conduct simultaneously, the bias voltage across resistor 400 will be increased to such an extent that all except one "B" section will be cut off. At this time the "B" section bias is correct. The "A" section bias is also correct since five "A" sections will be conducting. The ring is then in a stable condition.

Assume that flip-flop 402 in Figure 10 is in "odd" condition with the "B" section conducting. A negative trigger pulse applied to the "B" section grid circuits has no effect on those "B" sections that are already cut off. It does, however, trigger the "B" section of flip-flop 402, causing it to switch. Transients produced by this switching action are prevented from entering the trigger pulse line by diode 404.

As flip-flop 402 switches, a negative pulse from the "A" section plate is applied to the "A" section grid of flip-flop 403 through capacitor 405 and voltage divider 406, switching flip-flop 403 to "odd" condition. Thus the ring is advanced one element by each incoming trigger pulse. Output is taken from all "A" section plates, thereby providing a positive pulse when the tube is in "odd" condition.

Figure 11:
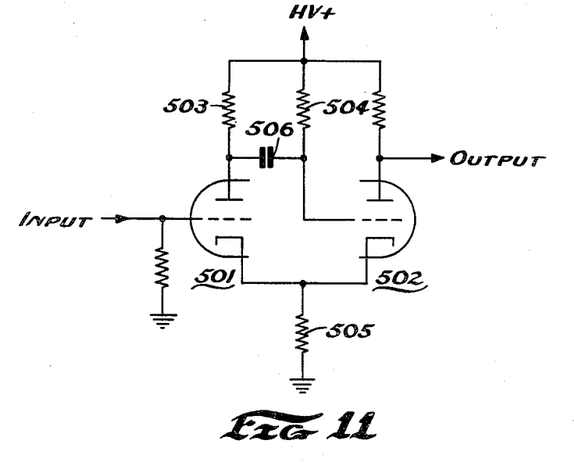
Figure 11 is a schematic diagram of a type of delay multivibrator employed in this invention.

*Delay multivibrator.*—Schematic representation of a type of delay multivibrator employed in this converter is shown in Figure 11. The delay multivibrator is stable in only one condition. An input pulse causes the circuit to switch; then after a period of time determined by circuit constants, it switches back to the original condition. In Figure 11, tube 502 will normally be in a state of heavy conduction, since a positive voltage is applied to its grid through resistors 503 and 504. A large voltage drop is produced across common cathode resistor 505 due to this condition, and this voltage will effectively bias tube 501 beyond cutoff. Should a positive pulse then be applied to the input, tube 501 will begin to conduct. The negative going voltage swing thus produced on the plate of tube 501 is coupled to the grid of tube 502 through capacitor 506. This reduces the conduction through tube 502, thereby lowering the voltage drop across common cathode resistor 505. With its bias decreased, tube 501 conducts even more, and the negative voltage swing coupled to the grid of tube 502 becomes greater. This action continues until tube 502 is completely cut-off and tube 501 is conducting heavily. The circuit will remain in this condition until the high negative charge that has accumulated on capacitor 506 has leaked off through resistor 503 to a point where tube 502 begins to conduct again. Since conduction through tube 502 will increase the voltage drop across resistor 505, the current flow through tube 501 will become less and its plate potential will increase. This positive voltage is coupled to the grid of tube 502 through capacitor 506, causing it to conduct more. This regenerative action continues and tube 502 is rapidly switched to a heavy conducting condition and tube 501 is again cut off. This circuit will remain in this state until another positive pulse is applied. Output taken from the plate of tube 502 is a sharply rising and falling pulse of a duration determined primarily by the time constant of capacitor 506 and resistor 504.

*Squaring amplifier.*—A squaring amplifier is similar to the above discussed delay multivibrator except that no coupling capacitor is employed and the grid voltage on the input triode is adjusted so that only a small input signal is required to initiate switching. Thus a sine wave applied to the input of a squaring amplifier causes the circuit to switch at the beginning of each half cycle, converting the sine wave to a square wave. A circuit of this type is shown schematically in Figure 12. The voltage divider composed of resistors 603 and 604 holds the grid potential of tube 601 to a point immediately beyond cut off. The voltage divider network composed of resistors 605 and 606 adjusts the grid voltage on tube 602 so that the tube is conducting heavily. The application of a small positive-going signal to the input will cause tube 601 to begin to conduct, reducing its plate potential. This negative voltage swing is coupled to the grid of tube 602, thereby causing less current flow through the tube. The voltage drop across cathode resistor 607 is decreased, permitting tube 601 to conduct even more. Due to this cumulative effect, the circuit is almost instantaneously switched to the condition where tube 601 is conducting heavily and tube 602 is cut off. The squaring amplifier will remain in this state for the duration of the positive half-cycle of the incoming sine wave.

Figure 12:
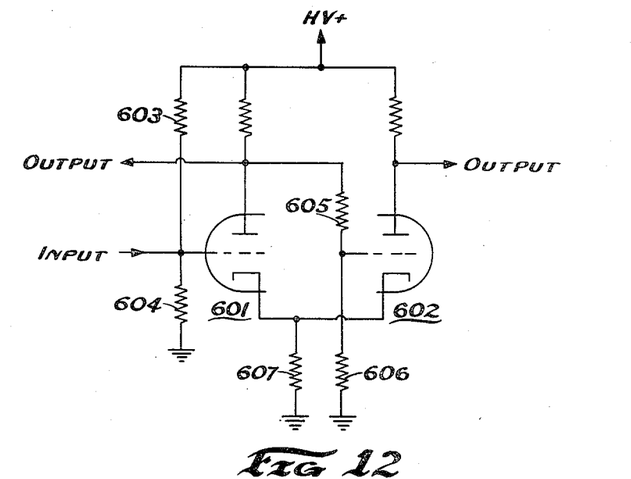
Figure 12 is a schematic diagram of a type of squaring amplifier used in this invention.

Near the end of the positive half-cycle of the signal input, the conduction through tube 601 decreases, thereby increasing its plate potential. This causes the positive potential on the grid of tube 602 to be increased, thus increasing the voltage through cathode resistor 607. Since tube 601 is partially biased by the voltage drop across resistor 607, current through tube 601 is reduced and its plate potential will be even higher. In this manner the circuit again switches to the condition where tube 601 is cut off and tube 602 is conducting. Output will be taken from either plate. Square waves in-phase with the input appear at the plate of tube 602 while the plate circuit of tube 601 produces an output inverted from that of the input.

*Gate circuits.*—A number of gate circuits are employed in the code converter, all of which are of the "pass gate" type wherein the signal passes through the gate when a particular control voltage is present. The gate circuits to be considered herein consist of diodes placed in series with a signal path. The control signal in all cases consists of a biasing voltage source which holds the cathode of the diodes positive with respect to the anodes. The positive voltage is either of a low or a high level whereby only negative-going pulses applied to cathodes during low-level bias conditions will be passed through the diodes.

Figure 2:
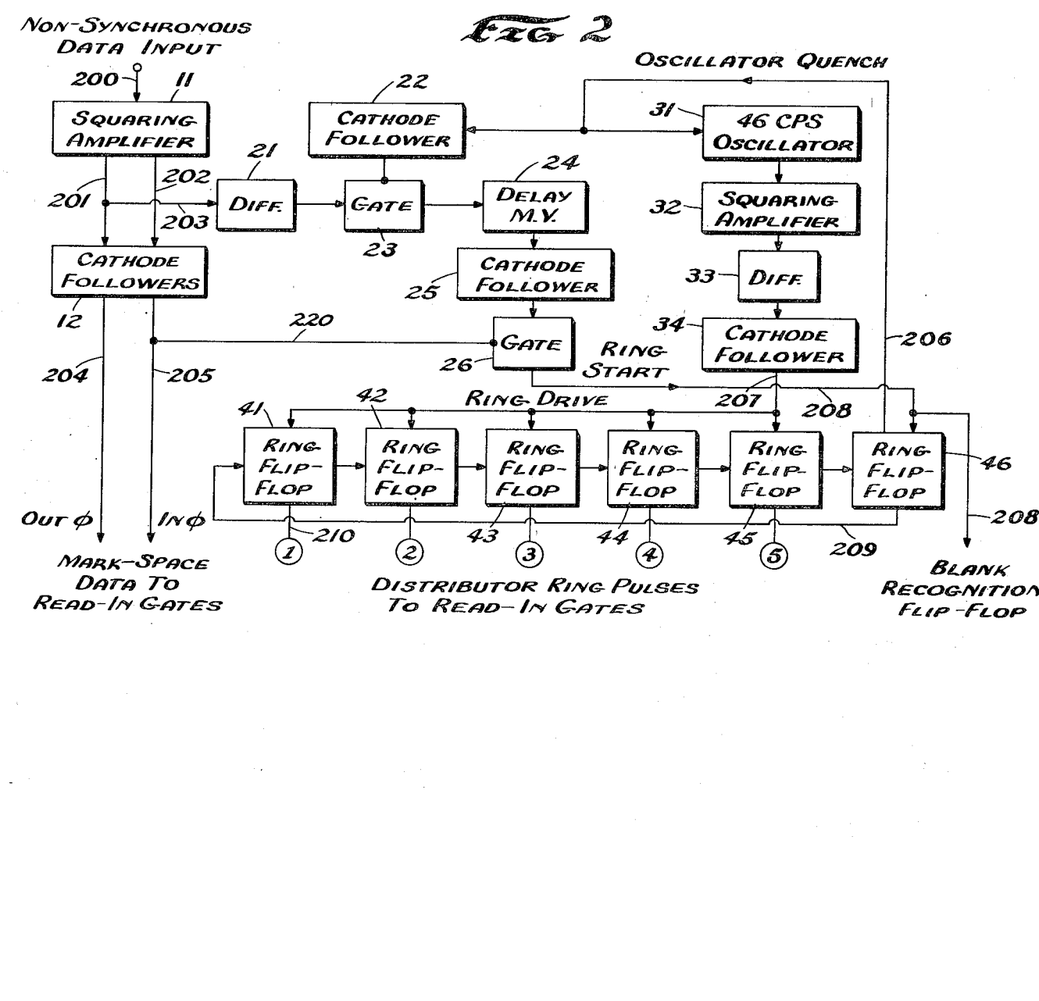
Figure 2 is a detailed functional diagram of the data read-in circuitry.

The operation of the code converter will now be described with respect to the detailed functional diagrams of Figures 2, 3, and 4 in conjunction with the wave forms illustrated in Figures 5 and 6. In certain cases a detailed description with reference to schematic diagrams will be made.

The code converter accepts non-synchronous signals from a teletypewriter into its input circuit. The five data pulses in this signal are distributed to five storage circuits at a suitable time; externally supplied timing pulses synchronously "read out" this information and deliver it to the output circuit. The converter also supplies start-stop pulses at a synchronous rate as discussed above.

At the beginning of the transmission of a character from the teletypewriter (see non-synchronous input wave form, Figure 5) a start pulse is applied to the code converter. With reference to Figure 2 the start pulse is applied from input connector 200 to a squaring amplifier 11. The squaring amplifier shapes the pulse and provides in-phase and inverted output to cathode followers 12. Mark output (inverted output) from the squaring amplifier is also applied through differentiator 21 and a gate 23 to delay multivibrator 24. For each incoming start pulse the delay multivibrator 24 furnishes a negative-going pulse delayed by an interval equal to one-half of a code element. This pulse is termed the ring start pulse (see wave form, Figure 5). By the use of this delayed start pulse the code converter samples the center portion of each successive data pulse, thereby providing for small changes in the teletypewriter speed during the transmission of the character. The delayed start pulse also makes possible the use of a false start inhibitor to be described later.

To describe the development of the negative ring-start pulse in more detail, the start element from the non-synchronous input appears at the output of squaring amplifier 11 as a negative-going pulse from conductor 202 (in-phase with the non-synchronous input) and also as a positive-going pulse on output connector 201 (inverted from the non-synchronous input). The positive-going pulse from connector 201 is applied through differentiator 21 and gate 23 (assuming gate 23 to be open) to delay multivibrator 24. The positive-going leading edge of the differentiated pulse is fed to delay multivibrator 24, thus triggering delay multivibrator 24 to provide a positive-going pulse of 11 ms. duration. This positive pulse is differentiated and applied to the cathode follower 25. Cathode follower 25 is of the "clipping" type wherein the grid is biased at cathode potential and any positive-going input signal will be greatly attenuated by grid current flow. Therefore, the negative going trailing edge of the differentiated pulse from delay multivibrator 24 predominates in the output of cathode follower 25. This signal, the ring-start pulse, is applied through a gate 26 (assuming gate 26 open) and through conductor 208 to ring flip-flop 46 to initiate a cycle of distributor ring pulses from ring flip-flop 41 through 45.

Transients occasionally appear in the Teletype input line due to noisy commutators in the Teletype transmitter, line noise, etc. To prevent these transients from producing false ring-start pulses, a false-start inhibitor circuit is provided. This circuit consists of gate 26, normally closed, through which the ring-start pulse must pass. Gate 26 is opened by the start pulse appearing at the output 205 of cathode follower 12. Since any pulse passing through the ring-start delay circuit is delayed by 11 ms. (one-half code element) by delay multivibrator 24 before appearing at gate 26, it must be at least 11 ms. in duration to pass through the gate. Thus short duration transients, which might otherwise cause false starting, are inhibited. A true start pulse, which is approximately 22 ms. in duration opens gate 26 and allows the ring-start pulse to be applied through connector 208 to the grid of ring flip-flop 46. Gate 26 consists of a diode whose cathode is biased positively from the cathode of cathode follower 25. This bias is high enough so that gate 26 will not conduct even when the negative pulse from cathode follower 25 arrives. However, when a start pulse (negative pulse) is presented through connector 220 from cathode follower 12, the bias on gate 26 is reduced enough to where the delayed negative-start pulse from cathode follower 25 will pass through. Therefore, any pulse that triggers multivibrator 24 and is simultaneously applied through connector 106 to gate 26, must be at least 11 ms. in duration to pass through gate 26.

Ring flip-flop 46 is in "odd" condition ("A" section cut off and "B" section conducting) at the start of a sequence of distributor ring operation. The above discussed negative ring-start pulse (illustrated in Figure 5), passing through gate 26, is applied through connector 208 to ring flip-flop 46 causing it to switch to "normal" condition (section "B" cut off and section "A" conducting). This switching controls three circuit functions:

(1) The negative going pulse appearing on the "A" section of ring flip-flop 46 is applied through connector 209 to ring flip-flop 41 thus switching ring flip-flop 41 from "normal" to "odd" condition. This pulse is differentiated before being applied to ring flip-flop 41.

(2) Pass gate 23 begins to conduct since the positive bias previously applied through cathode follower 22 is reduced. This conduction causes any further input pulses to gate 23 to be shunted to ground, preventing delay multivibrator 24 from being switched for the remainder of the cycle of the distributor ring operation.

(3) The quench circuit for oscillator 31 is disabled and ring drive oscillator 31 starts. Ring drive oscillator 31 operates at a rate of 46 C. P. S., approximately equivalent to the speed of element transmission from a 60 word per minute teletypewriter. Oscillator 31 is connected in a phase shift circuit to a resistor-capacitor network which provides out-of-phase coupling between grid and plate at a frequency of 46 C. P. S. A quench tube and its plate load resistance are shunted across the plate load resistance of the oscillator 31 tube, the cathode of the quench tube thereby being at the plate potential of oscillator 31 tube. The grid of the quench tube is positively biased from the plate of the normally cut-off section of ring flip-flop 46. The quenching action of oscillator 31 is controlled as follows:

Normally the quench tube is conducting and therefore effectively parallels its plate resistance with that of oscillator 31 tube. This reduces the gain of oscillator 31 below a point that will sustain oscillation. As ring flip-flop 46 is switched to normal condition by ring-start pulse, a positive grid bias applied to the oscillator quench tube through connector 206 is lowered, the quench tube cuts off and its plate resistance is removed from the plate circuit of oscillator 31. The resulting positive surge from the plate of the quench tube is at the same time applied to the grid of oscillator 31 insuring that the first half cycle of oscillation will be of full amplitude and of negative polarity. The output from oscillator 31 is shown in Figure 5.

Sine wave output from oscillator 31 is applied to the input of squaring amplifier 32. Detailed operation of this type of circuit has been previously described. Since the input grid of squaring amplifier 32 is biased at cut off, the first half-cycle (negative) of oscillator 31 output has no effect on the circuit. The second half cycle, being positive, produces a positive square wave in the output of squaring amplifier 32. The square wave is differentiated by differentiator 33 and applied to a clipping cathode follower 34. The action of such a cathode follower was previously shown to accentuate the negative trailing edge of differentiated input signals, and the resulting series of negative-going ring-drive trigger pulses are applied through connector 207 to the ring-drive line which is common to the "B" section grids of ring flip-flops 41, 42, 43, 44, and 45.

Ring-drive flip-flops 41 through 45 are successively switched from "normal" to "odd" condition at a rate approximately equal to the transmission of the five data pulses from a teletypewriter. The detailed operation of this circuit has been previously described. Ring flip-flop 41 being an "odd" condition is switched to "normal" condition with the first ring-drive pulse. This switching action causes ring flip-flop 42 to change to "odd" condition. The second ring-drive pulse switches ring flip-flop 42 to "normal" condition, causing ring flip-flop 43 to go to "odd" condition. Each succeeding ring-drive pulse switches the distributor ring one element further until ring flip-flop 46 is again in "odd" condition. At this time a positive voltage is again applied as an oscillator quench voltage and disables oscillator 31. Thus oscillator 31 delivers five cycles of oscillation during each sequence of distributor ring operations. The series of five distributor-ring pulses developed from ring flip-flops 41 through 45 are each applied to two gates leading to an associated storage flip-flop (see Figure 3). The positive-going distributor-ring pulses from terminals 1, 2, 3, 4, and 5 in Figure 2 are applied to corresponding terminals in Figure 3. The ring pulses are differentiated and applied to a series of gates 51 through 60. Thus a positive-going ring pulse from ring flip-flop 41, Figure 2, through connector 210 is differentiated and applied simultaneously to gates 51 and 52, Figure 3. The 46 cps. repetition rate of the pulses generated by the ring-drive circuitry corresponds approximately to the speed of element transmission from a 60 word per minute teletypewriter. Therefore, the first negative pulse generated by the ring-drive trigger circuit (see Figure 5) is applied to ring flip-flop 41 at a time corresponding to the center of the first data pulse from the teletypewriter. As the first ring-drive pulse switches ring flip-flop 41, negative-going output is taken from ring flip-flop 41, differentiated, and applied simultaneously to gating diodes 51 and 52 (Figure 3). In a similar manner, the ring pulses from ring flip-flops 42, 43, 44, and 45 are differentiated and applied simultaneously through a pair of gates to corresponding storage flip-flops. Note also in Figure 3 that voltages corresponding to mark input are applied from common connector 204 to one of each pair of read-in gates and, correspondingly, voltages corresponding to space input data are applied through common connector 205 to the second of each pair of read-in gates. With reference to Figure 2, this input mark and space data is taken from the outputs of cathode followers 12 and represent voltages in-phase with the non-synchronous input data and inverted voltage (out-of-phase) respectively. Each such incoming data pulse opens one or the other of the read-in gates and storage flip-flops 71 through 75 are triggered to conditions corresponding to mark or space information defining the element. Thus, this portion of the code converter accepts the five data pulses in the transmitted Teletype character and individually stores the information contained in them.

A series of seven consecutive timing pulses, termed "clock pulses" are furnished to the code converter by an external time base generator. These clock pulses are designated as clock pulses $\phi$, 1, 2, 3, 4, 5, and 6 and are represented as the read-out clock pulses shown in Figure 6. The clock pulses define and control the synchronous time rate at which elements of the stored character (represented by the condition of storage flip-flop 71 through 75) are delivered as synchronous output. The clock pulses $\phi$ through 4 read out the five elements defining a code character and are differentiated and applied to the storage flip flops through a series of read-out gates 81 through 90 (Figure 3). The clock pulses are passed through one or the other of each pair of gates associated with a storage flip flop depending upon the condition of the storage flip-flop as determined by the element data stored therein.

Figure 3:
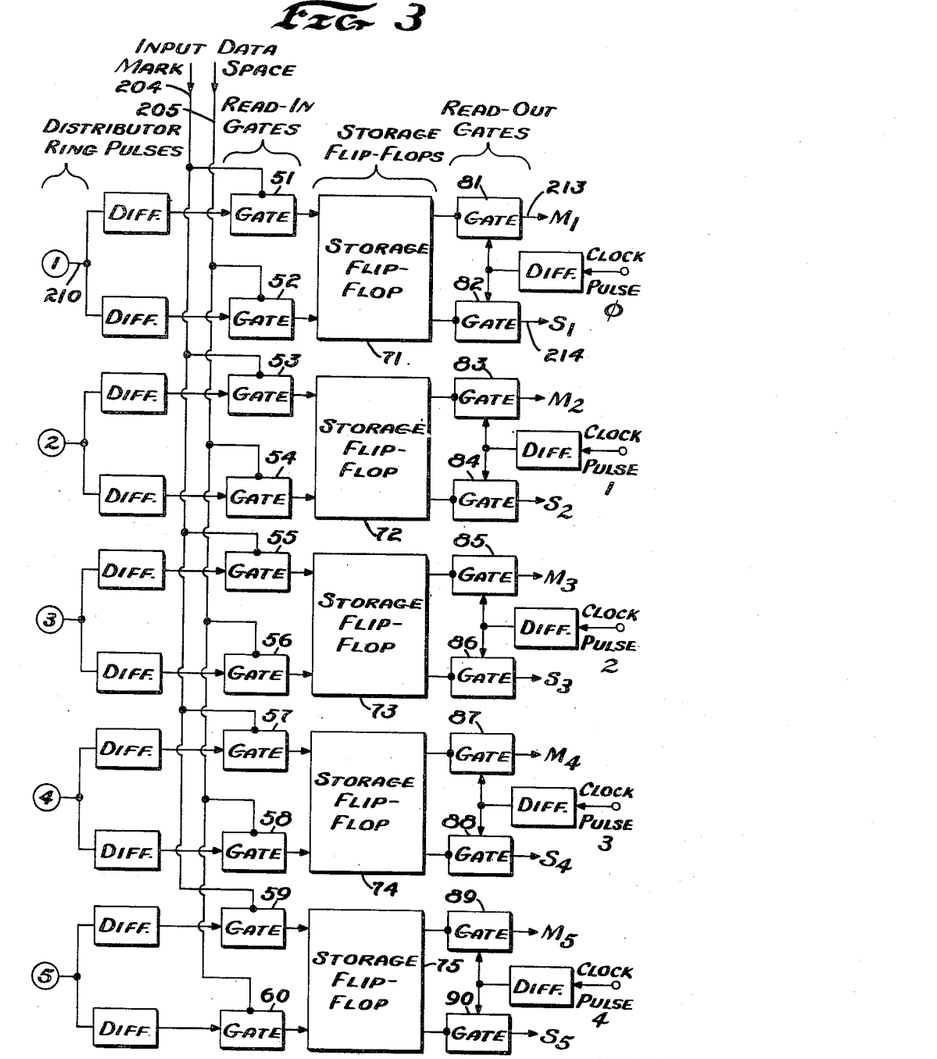
Figure 3 is a detailed functional diagram of the selector and read-out gate circuitry.
Figure 4:
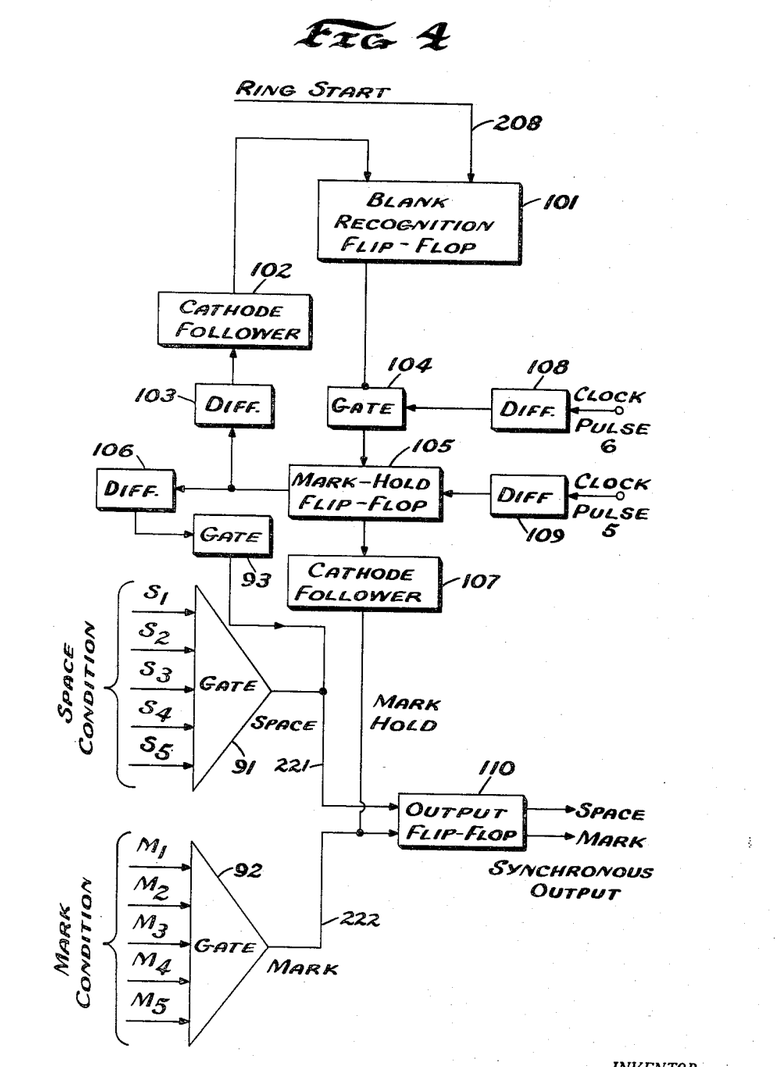
Figure 4 is a detailed functional diagram of the output and synchronous phasing circuitry.

The "mark" outputs, designated in Figure 3 as $M_1$ through $M_5$ are channeled in common to one section of the output flip flop, and the "space" outputs, designated in Figure 3 as $S_1$ through $S_5$, are channeled as common to the other section of the output flip flop. (See Figure 4.)

Before discussing the output circuitry, a detailed discussion of the operation of the read-in storage, and read-out circuitry for the channel associated with the first data element will be presented. The operation of each of the four remaining channels is identical, each controlled by its individual distributor ring and clock pulse.

Figure 7:
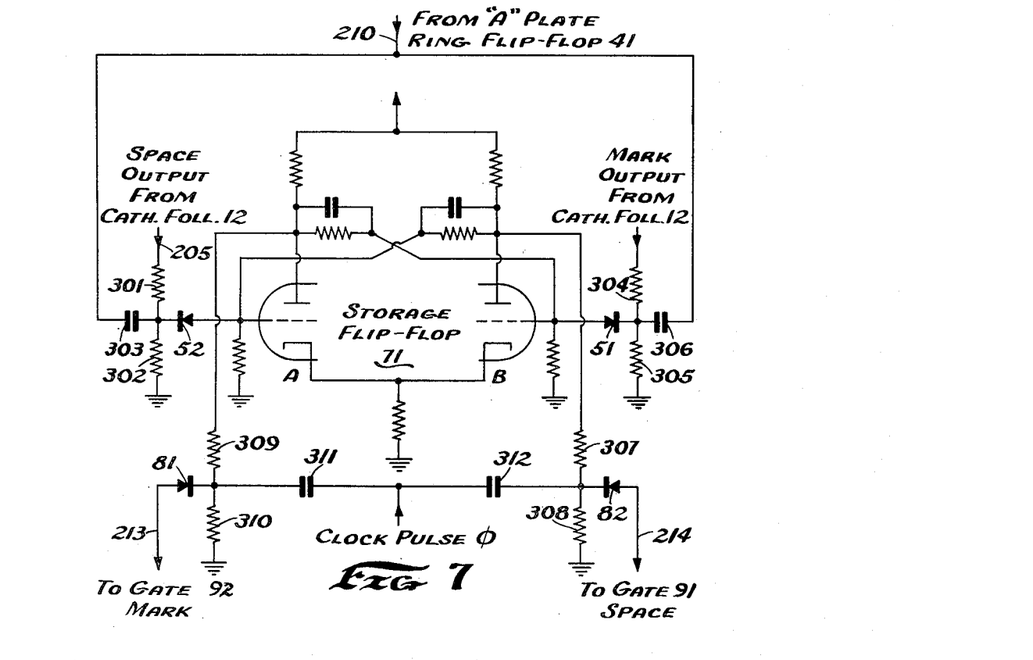
Figure 7 is a schematic diagram of the storage and read-out circuitry for code element 1, showing associated wave forms in time relationship.

Figure 7 represents schematically the circuitry associated with storage flip-flop 71 and its read-out gates 81 and 82 as well as read-in gates 51 and 52.

Read-in gates 51 and 52 are situated in the grid circuits of the two sections of the storage flip flop. The ring pulse from ring flip-flop 41 is applied simultaneously through differentiating circuits to the cathodes of read-in gates 51 and 52. With reference to the "A" section of storage flip-flop 71, the positive ring pulse from ring flip-flop 41 is differentiated by the RC combination of capacitor 303 and resistor 302. Space output from cathode follower 12 (see Figure 2) is applied from connector 205 through resistors 301 and 302 to ground. The grid of section "A" of flip-flop 71 is connected to the junction of resistors 301 and 302 through read-in gate 52. A similar circuit arrangement is connected to the grid of section "B" of flip-flop 71. The positive-ring pulse from ring flip-flop 41 is here differentiated by capacitor 306 and resistor 305. Mark output from cathode follower 12 (see Figure 2) is applied from connector 204 through resistors 304 and 305 to ground. The grid of section "B"

of flip-flop 71 is connected to the junction of resistors 304 and 305 through read-in gate 51. The "space" and "mark" voltages applied from connectors 205 and 204 through the voltage dividing networks represent voltages in-phase and inverted with respect to the teletypewriter input. Space voltage is defined as a low level voltage for space input whereas mark voltage is defined as a low-level voltage for the mark input. To follow the operation of storage flip-flop 71 in conjunction with the read-out gates, let us assume that the first data element for a particular input code character is a space; resulting in a low-level voltage on connector 205 and a corresponding inverted or high-level voltage on connector 204. Let us further assume that the first data element of the preceding code character was a mark so that storage flip-flop 71 is at the instant in mark condition. Storage flip-flop 71, as with storage flip-flops 72 through 75, is defined as being in mark condition when the "A" section is in a conducting state and the "B" section accordingly is non-conducting. Therefore, with the condition that the "A" section of flip-flop 71 is conducting, an input pulse, from ring flip-flop 41 is differentiated by capacitor 303 and resistor 302. With space input from the teletypewriter, the bias voltage on gate 52 from connector 205 at the junction of resistors 301 and 302 is low. Therefore, the negative trailing edge of the differentiated pulse is passed by diode 52, cutting off section "A" of flip-flop 71. Simultaneously section "B" conducts, its plate voltage falls, and the bias on read-out gate 82 at the junctions of resistors 307 and 308 is lowered. At this time clock pulse $\phi$ is differentiated by capacitor 312 and resistor 308 and applied to the cathode of read-out gate 82. Since a low-level bias from the plate of flip-flop 71 is present, clock pulse $\phi$ is passed by read-out gate 82, to gate 91 in the output circuitry. Clock pulse $\phi$ is also differentiated by capacitor 311 and resistor 310. However, since section "A" of storage flip-flop 71 is cut off, a high-positive bias appears on read-out gate 81 from the junction of resistors 309 and 310, and the negative trailing edge of the differentiated clock pulse is not passed by read-out gate 81.

In similar fashion it can be seen that if the first data element of the input code is a mark, rather than a space, the biasing levels for read-in gates 51 and 52 from connectors 204 and 205 are reversed, so that the ring-trigger pulse from flip-flop 41 is passed by read-in gate 51 rather than read-in gate 52 to cut off section "B" of flip-flop 71. The bias on read-out gate 81 rather than 82 is then low, permitting clock pulse $\phi$ to be passed through read-out gate 81 to gate 92 in the output circuitry. It is to be understood, of course, that should the storage flip flop be in space condition at the time of space input or mark condition at the time of mark input the conduction states of the flip-flop remain the same. Negative-trigger pulses will in this instance be applied to an already cut-off section of flip-flop 71. Therefore, clock pulse $\phi$, the first synchronous output element for the incoming code, is passed by read-out gate 82 for space input or by read-out gate 81 for mark input. The clock pulse is passed through either gate 91 or 92 to trigger output flip-flop 110 to a corresponding condition (see Figure 4). Note that in Figure 4, inputs $S_1$ through $S_5$ are applied through gate 91 and connector 221 to output flip-flop 110 and inputs $M_1$ through $M_5$ are applied through gate 92 and connector 222 to the output flip flop.

The operation of storage flip-flops 72 through 75 (Figure 3) is identical with that of the above discussed operation of flip-flop 71, with the exception that the ring-pulse inputs are taken from the corresponding ring flip-flops 42 through 45 and the read-out clock pulses are those for the second, third, fourth, and fifth elements of the code. Thus, storage flip-flops 71 through 75 are seen to be switched by the input code condition in conjunction with the associated ring-drive pulses to conducting states representative of mark or space condition for the particular element. The clock pulses passed through the mark condition read-out gates are all applied to one input of output flip-flop 110 and the clock pulses passed by the space condition read-in gates are all applied through the other input of output flip-flop 110.

A cycle of synchronous output transmission is started by the trailing edge of clock pulse 6. With reference to Figure 4, clock pulse 6, after passing through a differentiator 108 and gate 104, switches the mark-hold flip-flop 105. This generates a voltage which removes a clamp from output flip-flop 110, the clamp having held output flip-flop 110 in mark condition and non-responsive to space or mark input trigger pulses from gates 91 and 92. Simultaneously, output from mark-hold flip-flop 105 is applied through differentiator 106 and gate 93, and the negative-going trailing edge switches the output flip-flop 110 to space condition thus providing the start pulse of synchronous output. The trailing edge of clock pulse $\phi$, depending on the condition of storage flip-flop 71 (Figure 3) as discussed above, is applied through the $S_1$ or the $M_1$ connection to gate 91 or 92 (Figure 4) to output flip-flop 110. The output flip flop is then switched to a condition corresponding to the information contained in the storage flip-flop 71. Similarly clock pulses 1, 2, 3, and 4 read out the information contained in the other storage flip flops.

Clock pulse 5 is applied through differentiator 109 to mark-hold flip-flop 105, switching it to mark condition. This again clamps output flip-flop 110 in mark condition, furnishing a stop pulse as the seventh element of the synchronous output. Output is taken from both plates of output flip-flop 110.

Since non-synchronous input from the teletypewriter is normally arriving at the maximum speed of 60 words per minute and synchronous output is being delivered at a rate of 62 words per minute, it is necessary that the output occasionally pause to allow the input to "catch up." The blank-recognition circuit performs this function by deciding whether information in the storage flip flops will be read out immediately or held until the next synchronous cycle begins.

At the start of a synchronous cycle blank-recognition flip-flop 101 is in a condition that will close gate 104. The ring-start pulse applied to blank-recognition flip-flop 101 through connector 208 switches blank-recognition flip-flop 101 to its opposite position, opening gate 104. If this action occurs before the end of clock pulse 6, clock pulse 6 will pass through gate 104 and switch mark-hold flip-flop 105. This will unclamp output flip-flop 110 and allow information to be read out of the storage flip flops from the mark and space inputs. At the same time output from mark-hold flip-flop 105 is applied through differentiator 103 to blank-recognition flip-flop 101 to reset it for the next cycle of operation.

If gate 104 is opened after the end of clock pulse 6, the mark-hold flip-flop 105 will remain in a condition that will clamp the output flip-flop 110 in mark-hold condition for the entire synchronous cycle. The stored data pulses will then be read out as the following synchronous character.

Figure 5:
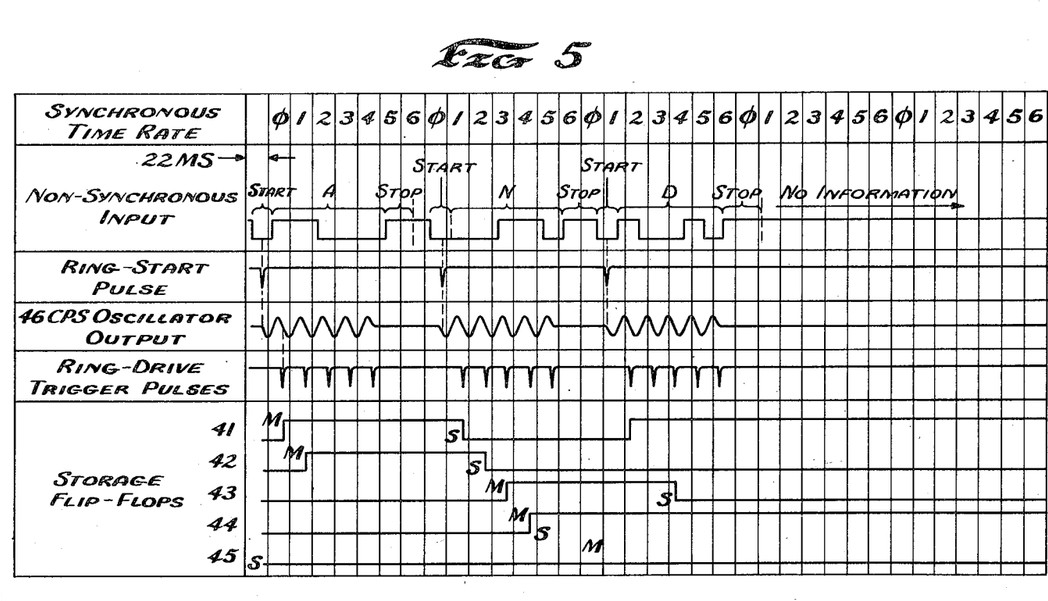
Figure 5 illustrates key wave forms of the input and storage circuitry in relation to the synchronous read-out time intervals.
Figure 6:
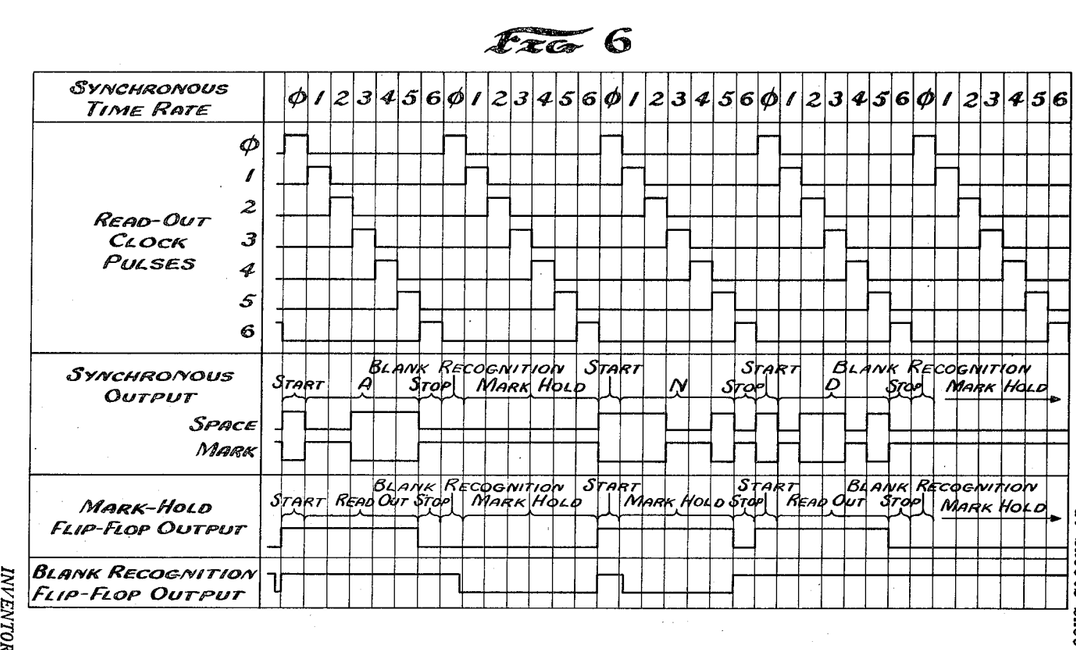
Figure 6 illustrates key wave forms in the synchronous output and phase synchronizing output.

The synchronous timing wave forms shown in Figure 5 illustrate typical code converter wave forms during transmission of the word "and." The ring-start pulse for the incoming character "a" arrives before the end of clock pulse 6 and "a" is, therefore, transmitted as the first synchronous output character. Since the start pulse for the character "n" arrives after the next clock pulse 6, the mark-hold condition is transmitted during the second synchronous interval. The third synchronous cycle transmits "n" while "d" is being stored. Letter "d" is transmitted as the fourth synchronous output character and, finally, mark-hold is again transmitted in the absence of further incoming information.

Figure 9:
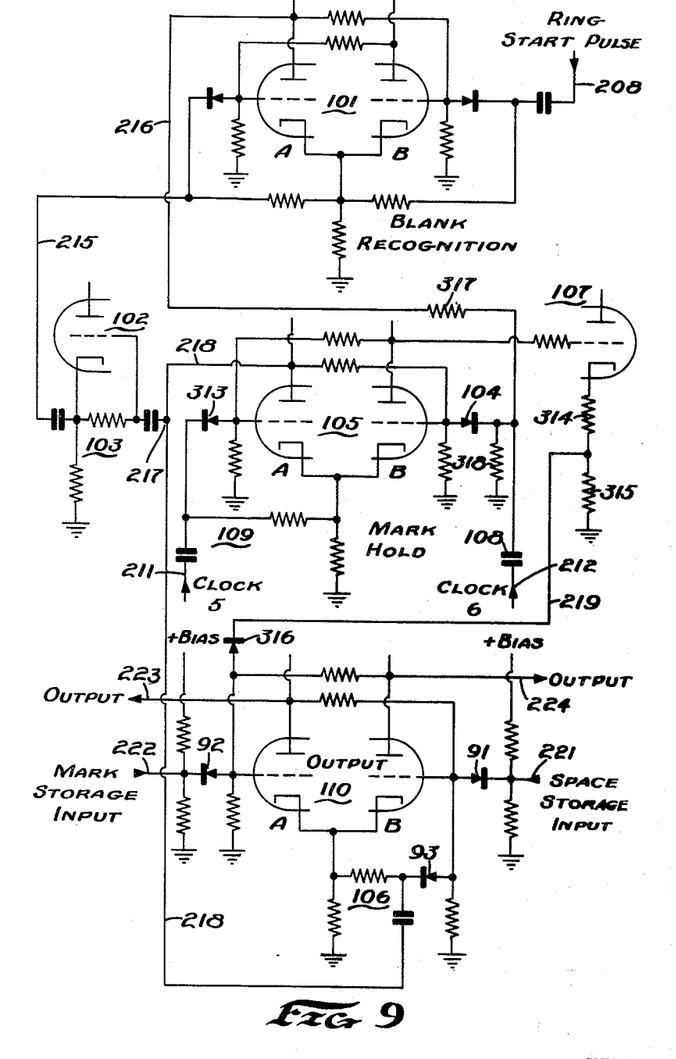
Figure 9 is a schematic diagram of the output circuitry including the phase synchronizing circuitry.

A more detailed analysis of the operation of the output flip flop, in conjunction with the blank-recognition circuitry and mark-hold circuitry, may be made with reference to the schematic diagram shown in Figure 9. Output flip-flop 110 is successively switched to conditions corresponding to information contained in the five storage flip flops. A voltage-high condition on the "A" section plate represents mark information and a voltage-high condition on the "B" section conforms to space information. Diode gates 91 and 92 to which space or mark information from the storage flip flops is applied through connectors 221 and 222, respectively, prevent transients generated by the switching action of output flip-flop 110 from feeding back into the read-out lines.

Plate voltages from flip-flop 110 through connectors 223 and 224 represent synchronous output both in-phase and inverted with respect to the non-synchronous input.

As mentioned above, clock pulses $\phi$, 1, 2, 3, and 4 read out the information contained in the five storage flip flops, while clock pulse 5 is used to furnish the stop pulse for the synchronous character. With reference to Figure 9, clock pulse 5 is shown applied through connector 211. The pulse is differentiated by differentiator 109 and applied to diode gate 313. Gate 313 passes only the negative-going trailing edge of clock pulse 5 so that mark-hold flip-flop 105 is switched at the end of clock pulse 5 to where the "A" section of the tube is cut off and the "A" section plate is at a high-voltage level. The "B" section of flip-flop 105 is then conducting. The "B" section plate voltage is applied to cathode follower 107. The voltage at the junction of resistors 314 and 315 provides a cathode bias through connector 219 to diode 316 in the grid circuit of output flip-flop 110. This biasing voltage is lowered when the "B" section of flip-flop 105 conducts by an amount sufficient to allow diode 316 to conduct. The conduction of diode 316 effectively short circuits the "A" section grid of output flip-flop 110, thereby preventing any further clock pulses passed through the storage read-out gates from switching output flip-flop 110. Also flip-flop 110 is placed in a condition corresponding to mark information, that is, the "A" section cut off and the "B" section conducting. In this way a stop pulse is supplied at the end of the five synchronous data pulses in the output.

As mentioned above, the non-synchronous input to the code converter is arriving at a maximum of 60 words per minute. The synchronous output rate is fixed at 62 words per minute, therefore, assuming the input teletypewriter is transmitting at its maximum rate, about one out of each 23 incoming characters will arrive after the time of synchronous output character is due to start. In this event the code converter will deliver mark-hold output for the period of one synchronous character and hold the incoming character in storage. This function whereby the code converter pauses for the non-synchronous input to catch up with the synchronous output character is initiated by clock pulse 6. Clock pulse 6 is applied through connector 212 and differentiator 109 to gate 104. Gate 104 is biased by resistors 317 and 318 through connector 216 which is tied to the "A" section plate of blank-recognition flip-flop 101. If blank-recognition flip-flop 101 is in a condition where the "A" section of the tube is conducting, the bias on gate 104 will be low enough to permit the negative-trailing edge of clock pulse 6 to pass through. However, blank-recognition flip-flop 101 is normally in a condition where the "A" section is cut off. A ring-start pulse (which is initiated in the center of each incoming start code element) is applied through connector 208 to cut off the "B" section of flip-flop 101 and open gate 104. Therefore, if the trailing edge of clock pulse 6 occurs after the time of the ring-start pulse, it will pass through gate 104 to cut off the "B" section of the mark-hold flip-flop 105. The "A" section of flip-flop 105 is then in a conducting state. The resulting rise in "B" section plate voltage applied to cathode follower 107 places a positive bias from resistor 314 and 315 in the cathode of cathode follower 107 on gate 316. Gate 316 is no longer conductive and the clamp is removed from output flip-flop 110. Simultaneously negative output from the "A" section plate of mark-hold flip-flop 105 is applied through connector 218 to gate 93 in the "B" section grid circuit of output flip-flop 110. The "B" section of output flip-flop 110 is thus cut off, a condition corresponding to space output. This furnishes the start pulse of a synchronous character. Also negative output from the "A" section plate of mark-hold flip-flop 105 is applied through connector 217 and differentiator 103 to a clipping cathode follower 102. The negative output of cathode follower 102 is then applied through connector 215 back to the "A" section grid of blank-recognition flip-flop 101 and switches flip-flop 101 back to its normal condition where the "A" section is cut off. Thus gate 104 in the "B" section grid of mark-hold flipflop 105 becomes closed until the next ring start pulse initiates another decision of the blank-recognition flip-flop 101.

In the event that the trailing edge of clock pulse 6 occurs before the arrival of a ring-start pulse, gate 104 will not be opened in time for mark-hold flip-flop 105 to be switched by clock pulse 6. The clamp on output flip-flop 110 through connector 219 will be maintained since the "B" section of mark-hold flip-flop 105 is still conducting, and output flip-flop 110 will be held in mark condition for one synchronous character interval. However, the ring-start pulse applied through connector 208 to blank-recognition flip-flop 101 will have switched flip-flop 101 so that gate 104 in the "B" section grid of mark-hold flip-flop 105 will be open to pass the following clock pulse 6. The input character that has arrived too late will be automatically transmitted in the next output time interval.

It is thus seen that the output circuitry described regulates the phasing of the input and output such that the output circuitry occasionally is held in a command mark-hold condition until such a time that the input read-in rate catches up with the output rate. Until the phasing between input and output reaches the point where a synchronous output cycle is due to start before an input character has been completely stored in a storage flip flop, synchronous output is delivered simultaneously with the storage of input elements. When the output gets ahead of the input rate, the stored information is held during a complete synchronous cycle; then read-out during the following synchronous cycle while the next input character is being stored. The storage function, therefore, might more appropriately be termed that of selection. The faster read-out rate together with the mark-hold command information supplied by the blank-recognition decisions requires that but a single storage or selector level be necessary due to the unique control over the input and output phasing.

It is thus seen that this invention provides an electronic code converter to supply fully synchronous output from a non-synchronous input. It is also seen that by this invention, wherein the element read-out rate is faster than the element read-in rate, makes possible the use of but one storage level with no loss of information, since the character read-in rate does not exceed the character read-out rate.

Although this invention has been described with respect to a particular embodiment thereof, it is not to be so limited as changes and modifications may be made therein which are within the full intended scope of the invention as defined by the appended claims.

I claim:

1. Means for converting a non-synchronous mark-space code from a teletypewriter into a synchronous code comprising means for space distributing the data defining elements of each code character in a single level of storage, said storage level comprised of a plurality of flip-flops being individually switched to conductive states representative of the mark or space condition of each code element, a plurality of synchronous voltage pulses in space distribution applied individually to certain ones of said storage flip-flops, an output flip-flop, means for successively triggering said output flip-flop to a conductive state determined by the conductive states of each of said storage multivibrators, and output control means whereby said output flip-flop is clamped in mark condition for the period of a complete synchronous character should an input character begin after a synchronous output character is due to start.

2. An electronic code converter for converting a non-synchronous mark-space input signal from a teletypewriter to a synchronous output code, comprising, a distributor timing ring, said ring initiating a plurality of space distributed pulses adapted to be individually coincident with each code element, a plurality of storage flip-flops, a pair of read-in gates connected to the inputs of each of said storage flip-flops, each pair of read-in gates receiving individual ones of said pulses from said distributor timing ring, means for inverting said input signal, the first one of each pair of read-in gates connected to said non-synchronous input signal, the second one of each pair of read-in gates connected to the inverted input signal, the outputs of each storage flip-flop individually connected to a pair of read-out gates, an output flip-flop, first ones of each pair of read-out gates connected to a first input of said output flip-flop, second ones of each pair of read-out gates connected to a second input of said output flip-flop, a source of synchronous clock pulses, individual ones of said clock pulses connected to each of said pairs of read-out gates, wherein said clock pulses are passed to the output flip-flop through particular ones of each of said pairs of read-out gates as controlled by the information stored within the storage flip-flop associated therewith, whereby the output of said input flip-flop is successively switched to a condition corresponding to each data element of said non-synchronous code input and the rate of such switching is controlled by said synchronous clock pulses.

3. An electronic code converter as described in claim 2 wherein the period of a synchronously read-out code character is less than the nominal period of a non-synchronous input character.

4. An electronic code converter as described in claim 2 wherein said output flip-flop is controlled by phasing circuitry such that the output flip-flop is clamped in a conductive state indicative of mark information for the period of a complete synchronous output character at such times as the start of an input character to said code converter arrives after the time that a synchronous output character is due to start.

5. An electronic code converter as described in claim 2 wherein the period of a synchronously read-out code converter is less than the nominal period of a non-synchronous input character, and the output flip-flop is controlled by phasing circuitry such that the output flip-flop is clamped in a conductive state indicative of mark information for the period of a complete synchronous output character at such times as the start of an input character to said code converter arrives after the time that a synchronous output character is due to start.

6. A code converter system including, input signals including data defining elements, means for inverting said signals, means for inhibiting false starts, gating means, signals from said inverting means applied to said gating means and said inhibiting means, space-distributing means for providing space distributed timing pulses, a normally quenched timing oscillator having a fixed frequency output, said frequency determined by said data defining elements, output signals from said inhibiting means fed to said space distributing means, certain output signals from said space-distributing means fed to said timing oscillator whereby said timing oscillator is unquenched, the output signal from said oscillator fed to said space distributing means, certain other output signals from said space distributing means fed to said gating means, phase comparison means, said output from said inhibiting means connected to said phase comparison means, a plurality of synchronous clock pulses, certain ones of said clock pulses connected to said phase comparison means, a plurality of storage devices for storing information bits, a plurality of synchronous read-out gating means, certain pairs of said read-out gating means connected individually to certain ones of said storage devices, certain ones of said clock pulses applied individually to certain pairs of said read-out gates, output determining means connected to said read-out gating means for converting the output from said read-out gating means into synchronous output signals, said output determining means connected to said phase comparison means, and the output from said phase comparison means controlling said output determining means whereby said output determining means is clamped in a command condition at such times as the output from said false start inhibiting means occurs after a certain one of said clock pulses is applied to said phase comparison means.

7. A code converter system including, input signals including data defining elements, means for inverting said signals, means for inhibiting false starts, gating means, said gating means consisting of a plurality of diode gates, signals from said inverting means applied to certain ones of said diode gates and to said inhibiting means, a distributor timing ring, a normally quenched timing oscillator having a fixed frequency output, said frequency determined by said data defining elements, output signals from said inhibiting means fed to said distributor timing ring, certain output signals from said distributor timing ring fed to said timing oscillator whereby said oscillator is unquenched, output signals from said oscillator fed to said distributor timing ring, certain other output signals from said distributor timing ring fed to certain ones of said diode gates, a plurality of storage flip-flops, the outputs of a pair of said diode gates connected to the inputs of each of said storage flip-flops, the outputs of each storage flip-flop individually connected to a pair of read-out gates, a plurality of synchronous clock pulses, certain ones of said plurality of clock pulses applied individually to certain pairs of said read-out gates, an output flip-flop, first ones of each pair of read-out gates connected to a first input of said output flip-flop, second ones of each pair of read-out gates connected to a second input of said output flip-flop, phase comparison means, said output from said inhibitor means connected to said phase comparison means, certain ones of said clock pulses connected to said phase comparison means, and the outputs of said phase comparison means connected to said first and second inputs of said output flip-flop wherein said output flip-flop is clamped and nonresponsive to input signals when the phasing between the output of said inhibitor means and certain ones of said clock pulses applied as inputs to said phasing means is of a predetermined relationship.

8. A code converter system including, input signals including data defining elements, means for inverting said signals, means for inhibiting false starts, gating means, said gating means consisting of a plurality of diode gates, signals from said inverting means applied to certain ones of said diode gates and to said inhibiting means, a distributor timing ring, a normally quenched timing oscillator having a fixed frequency output, said frequency determined by said data defining elements, output signals from said inhibiting means fed to said distributor timing ring, certain output signals from said distributor timing ring fed to said timing oscillator whereby said oscillator is unquenched, output signals from said oscillator fed to said distributor timing ring, certain other output signals from said distributor timing ring fed to certain ones of said diode gates, a plurality of storage flip-flops, the outputs of a pair of said diode gates connected to the inputs of each of said storage flip-flops, the outputs of each storage flip-flop individually connected to a pair of read-out gates, a plurality of synchronous clock pulses, certain ones of said plurality of clock pulses applied individually to certain pairs of said read-out gates, an output flip-flop, first ones of each pair of read-out gates connected to a first input of said output flip-flop, second ones of each pair of read-out gates connected to a second input of said output flip-flop, phase comparison means including a first flip-flop, a first one of said clock pulses applied to a first input of said first flip-flop, a diode gate, the output of said gate connected to a second input of said first flip-flop, a second one of said clock pulses applied to the input of said diode gate, a second flip-flop, a first output from said first flip-flop connected to the first input of said output flip-flop and to a first input of said second flip-flop, a second output from said first flip-flop connected to said second input of said output flip-flop, the output from said inhibitor means connected to a second input of said second flip-flop, and an output of said second flip-flop connected to said diode gate, whereby the second output from said first flip-flop provides a clamping voltage on said output flip-flop when the output of said inhibitor means occurs after said second clock pulse.

References Cited in the file of this patent

UNITED STATES PATENTS

| | | |
|---|---|---|
| 2,359,649 | Kahsn et al. | Oct. 3, 1944 |
| 2,685,613 | Liguori | Aug. 3, 1954 |
| 2,721,230 | Dingley | Oct. 18, 1955 |
| 2,786,137 | Paivinen | Mar. 19, 1957 |